Patented Dec. 7, 1943

2,335,882

UNITED STATES PATENT OFFICE 2,335,882

PRINTING INK

Adolf J. Pingarron, Hollis, N. Y., assignor to Interchemical Corporation, New York, N. Y., a corporation of Ohio No Drawing. Application March 19, 1942, Serial No. 435,343

9 Claims. (Cl. 106—24)

This invention relates to printing inks which can be set or dried by the application of water thereto and aims to provide an improved ink of this character which has greatly increased press stability and yet dries at least as well as other inks of the same general character.

Inks which may be dried by the application of water upon the freshly printed film and methods of printing with such inks are disclosed and claimed in Gessler et al. Patent No. 2,157,385, dated May 9, 1939. Such inks contain a water-soluble solvent, usually a polyglycol or a polyether alcohol. When water is sprayed upon or otherwise added to a printed film of an ink of this character, it causes the ink binder to be precipitated so that upon evaporation or removal of the solvent and water, such as by penetration into the paper, the ink is substantially dry. Due to the fact that the solvents best suited for use in these inks are hygroscopic, difficulties in operation are encountered when the weather is humid. That is, the ink solvent, which may be diethylene glycol, due to its hygroscopicity, absorbs moisture from the air. This causes thinning of the ink and may even be sufficient to cause precipitation of the binder. Obviously, such adversely-affected inks do not function properly in the water-set printing process. The use of a less hygroscopic solvent, while reducing the water-absorbing difficulties during humid weather, is not a practical solution to this problem because it often necessitates a considerable sacrifice in the water-setting properties of the ink; and most such solvents are more expensive than the hygroscopic solvents.

I have discovered that by incorporating a small percentage of an alkylolamine into the ink vehicle it is possible to eliminate the difficulty of thinning of the ink and/or precipitation of the binder during humid weather and at the same time retain the proper water-setting characteristics of the ink. My improved inks thus comprise pigment dispersed in a vehicle including a water-precipitable binder dissolved in a water-soluble hygroscopic solvent and from 1% to 3% of an alkylolamine soluble in said solvent.

Although I do not fully understand the action that takes place when alkylolamines are added to water-setting inks, it appears that, because of the alkalinity of the alkylolamines, soaps may be formed which in some way inhibit the absorption of water by the ink while it is on the press. In any event, when an alkylolamine is added in amounts of from 1% to 3% to an otherwise standard water-setting ink, I have found that the stability of the thus treated ink under a humid hood is increased at least 300%.

Typical examples of inks made in accordance with the principles of my invention are as follows:

*Example 1—Red ink*

| | Parts by weight |
|---|---|
| Lithol rubine | 39.60 |
| Lithol barium toner | 55.00 |
| Blanc fixe | 24.25 |
| Varnish A (reaction product of 400 parts rosin and 100 parts of fumaric acid, dissolved in 315 parts diethylene glycol) | 132.00 |
| Varnish B (reaction product of 622 parts phthalic anhydride and 357 parts glycerin, dissolved in 42 parts ethylene glycol and 666 parts diethylene glycol) | 35.25 |
| Varnish C (25 parts zein, dissolved in 75 parts diethylene glycol) | 57.25 |
| Paraffin wax compound | 4.00 |
| Diethylene glycol | 40.00 |
| Wetting agent compound | 15.50 |
| Triethanolamine | 4.50 |
| | 407.30 |

Except for the addition of the 1.10% of triethanolamine in accordance with my invention the ink of this example is a standard water-setting ink. When the ink of the example was checked under a humid hood with an average relative humidity of 85% at 74° F., it was found that it had a press stability 300% greater than that of the standard ink. When printed and sprayed with either water or steam, drying was equally as good as that obtained with the standard ink.

*Example 2—Orange ink*

| | Parts by weight |
|---|---|
| Titanium dioxide | 9.0 |
| Blanc fixe | 30.0 |
| Burnt Italian sienna | 2.0 |
| Chrome yellow | 45.0 |
| Sodium lithol | 35.0 |
| Varnish B of Example 1 | 35.0 |
| Varnish C of Example 1 | 50.0 |
| Varnish A of Example 1 | 110.0 |
| Diethylene glycol | 20.0 |
| Wetting agent compound | 5.0 |
| Paraffin wax compound | 4.0 |
| Triethanolamine | 4.0 |
| | 349.0 |

Except for the addition of 1.15% of triethanolamine, the ink of this example is a standard water-setting ink. The addition of the triethanolamine in accordance with my invention increased the press stability over 300% as compared with the standard ink. As with Example 1, the drying of the ink of Example 2 was equally as good as that obtained with the standard inks.

Example 3—Yellow ink

| | Parts by weight |
|---|---|
| Medium chrome yellow | 203.0 |
| Chrome orange | 44.0 |
| Burnt turkey umber | 2.0 |
| Varnish C of Example 1 | 36.0 |
| Varnish B of Example 1 | 47.0 |
| Varnish A of Example 1 | 65.0 |
| Diethylene glycol | 26.0 |
| Triethanolamine | 6.0 |
| | 429.0 |

In this example, the addition of the 1.4% of triethanolamine was found to increase the press stability of the ink over 300% as compared with the same ink or a standard ink without triethanolamine. Water-setting of the ink was equally as good as that obtained with the standard inks.

Example 4—Red ink

| | Parts by weight |
|---|---|
| Sodium lithol red | 20.0 |
| Blanc fixe | 5.0 |
| Talc | 5.0 |
| Petroleum wax | 2.0 |
| Varnish A of Example 1 | 63.0 |
| Diethylene glycol | 5.0 |
| Triethanolamine | 2.0 |
| | 102.0 |

The results obtained with the ink of this example were substantially the same as Examples 1, 2 and 3.

Example 5

Same as Example 4 except that 2.0 parts of monoethanolamine were substituted for the triethanolamine and the results were equally good.

Example 6

Same as Example 4 except that 2.0 parts of diethanolamine were substituted for the triethanolamine, again with equally good results.

Example 7

Same as Example 4 except that 2.0 parts of a mixture of mono-, di- and triethanolamine was substituted for the triethanolamine and equally good results were obtained. That is, the drying properties were not affected while the stability under a humid hood was increased 300%.

The foregoing examples indicate that the binder of the water-set inks is in most cases a mixture of various resinous materials alone or with zein. It should be understood, however, that zein alone or any water-precipitable binder dissolved in a water-soluble hygroscopic solvent may be used in practicing my invention.

In addition to mono-, di- and triethanolamine and mixtures of these materials, any other alkylolamines of similar solubility in the ink vehicles may be used.

What I claim is:

1. A printing ink comprising pigment dispersed in a vehicle including a water-precipitable binder dissolved in a water-soluble hygroscopic solvent, and from 1 to 3% of an alkylolamine soluble in said solvent.

2. A printing ink comprising pigment dispersed in a vehicle including a water-precipitable resinous material dissolved in a polyglycol solvent, and from 1 to 3% of an alkylolamine soluble in said solvent.

3. A printing ink comprising pigment dispersed in a vehicle including a water-precipitable binder dissolved in a water-soluble hygroscopic solvent, and from 1 to 3% of triethanolamine.

4. A printing ink comprising pigment dispersed in a vehicle including a water-precipitable resinous material dissolved in a polyglycol solvent, and from 1 to 3% of triethanolamine.

5. A printing ink comprising pigment dispersed in a vehicle including a water-precipitable binder dissolved in a water-soluble hygroscopic solvent, and from 1 to 3% of monoethanolamine.

6. A printing ink comprising pigment dispersed in a vehicle including a water-precipitable binder dissolved in a water-soluble hygroscopic solvent, and from 1 to 3% of diethanolamine.

7. A printing ink comprising pigment dispersed in a vehicle including a water-precipitable binder dissolved in a water-soluble hygroscopic solvent, and from 1 to 3% of a mixture of mono-, di- and triethanolamine.

8. A printing ink comprising pigment dispersed in a vehicle including a binder comprising the reaction product of rosin and fumaric acid dissolved in diethylene glycol, and from 1 to 3% of an alkylolamine soluble in diethylene glycol.

9. A printing ink comprising pigment dispersed in a vehicle including a binder comprising zein dissolved in a polyglycol solvent, and from 1 to 3% of an alkylolamine soluble in said solvent.

ADOLF J. PINGARRON.